United States Patent
Li et al.

(10) Patent No.: US 11,779,887 B2
(45) Date of Patent: *Oct. 10, 2023

(54) FULL-EFFECT REVERSE OSMOSIS MEMBRANE ELEMENT, AND WATER PURIFIER HAVING SAME

(71) Applicant: Shenzhen Angel Drinking Water Industrial Group Corporation, Shenzhen (CN)

(72) Inventors: Guoping Li, Guangdong (CN); Kai Zhao, Guangdong (CN); Jing Lei, Guangdong (CN); Juan Wang, Guangdong (CN)

(73) Assignee: SHENZHEN ANGEL DRINKING WATER INDUSTRIAL GROUP CORPORATION, Guangdong (CN)

(*) Notice: Subject to any disclaimer, the term of this patent is extended or adjusted under 35 U.S.C. 154(b) by 203 days.

This patent is subject to a terminal disclaimer.

(21) Appl. No.: 16/979,042

(22) PCT Filed: Oct. 22, 2018

(86) PCT No.: PCT/CN2018/111267
§ 371 (c)(1),
(2) Date: Sep. 8, 2020

(87) PCT Pub. No.: WO2019/192162
PCT Pub. Date: Oct. 10, 2019

(65) Prior Publication Data
US 2021/0008501 A1    Jan. 14, 2021

(30) Foreign Application Priority Data
Apr. 2, 2018 (CN) .......................... 201810281393.6

(51) Int. Cl.
*B01D 61/08* (2006.01)
*B01D 63/10* (2006.01)
*C02F 1/44* (2023.01)

(52) U.S. Cl.
CPC ........... *B01D 63/103* (2013.01); *B01D 61/08* (2013.01); *C02F 1/441* (2013.01);
(Continued)

(58) Field of Classification Search
CPC .............. B01D 63/103; B01D 2313/04; B01D 2313/08
See application file for complete search history.

(56) References Cited

U.S. PATENT DOCUMENTS 4,814,079 A * 3/1989 Schneider ............ B01D 63/103
                                               210/321.83
8,236,177 B1    8/2012 Wood
(Continued)

FOREIGN PATENT DOCUMENTS

CN    102976447 A    3/2013
CN    103521076 A    1/2014
(Continued)

OTHER PUBLICATIONS

Huang R—CN 103421076 A Machine Translation—Jan. 22, 2014 (Year: 2014).*
(Continued)

*Primary Examiner* — Bradley R Spies
(74) *Attorney, Agent, or Firm* — Panitch Schwarze Belisario & Nadel LLP

(57) ABSTRACT

A full-effect reverse osmosis membrane element includes a central tube and a reverse osmosis membrane assembly wound around the central tube. The reverse osmosis membrane assembly includes a pair of reverse osmosis membranes attached at front surfaces thereof and wound around (Continued)

the central tube. A water feed channel has a water inlet formed at front edges of the reverse osmosis membranes and a water outlet formed at rear edges of the reverse osmosis membranes. A water division structure is arranged in the water feed channel, and includes a first water division band forming a preset space with the central tube when the reverse osmosis membranes are in an unfolded state. The first water division band divides the water feed channel into a first flow channel having a gradually decreasing cross-section and a second flow channel in communication with the first flow channel.

8 Claims, 3 Drawing Sheets

(52) U.S. Cl.
CPC ...... *B01D 2313/04* (2013.01); *B01D 2313/08* (2013.01); *B01D 2313/19* (2013.01); *B01D 2321/2016* (2013.01)

(56) References Cited

U.S. PATENT DOCUMENTS

| | | | |
|---|---|---|---|
| 2004/0222158 A1* | 11/2004 | Husain | B01D 65/02 |
| | | | 210/651 |
| 2004/0226886 A1* | 11/2004 | Hester | C02F 3/102 |
| | | | 210/488 |

FOREIGN PATENT DOCUMENTS

| | | |
|---|---|---|
| CN | 104437096 A | 3/2015 |
| CN | 104492268 A | 4/2015 |
| CN | 204799110 U | 11/2015 |
| CN | 106745524 A | 5/2017 |
| CN | 108404670 A | 8/2018 |
| GB | 2164871 A * | 4/1986 ........... B01D 63/103 |
| WO | 2013085701 A2 | 6/2013 |

OTHER PUBLICATIONS

Int'l Search Report dated Dec. 27, 2018 in Int'l Application No. PCT/CN2018/111267.
Li et al., "Water Treatment and Water Quality Control of Power Plant," Beijing: China Electric Power Press, 6 pages (2011).

* cited by examiner

FULL-EFFECT REVERSE OSMOSIS MEMBRANE ELEMENT, AND WATER PURIFIER HAVING SAME

CROSS-REFERENCE TO RELATED APPLICATIONS

This application is a Section 371 of International Application No. PCT/CN2018/111267, filed Oct. 22, 2018, which was published in the Chinese language on Oct. 10, 2019, under International Publication No. WO 2019/192162 A1, which claims priority under 35 U.S.C. § 119(b) to Chinese Application No. 201810281393.6, filed Apr. 2, 2018, the disclosures of each of which are incorporated herein by reference in their entireties.

TECHNICAL FIELD

The present application relates to the field of water treatment devices, in particular to a full-effective reverse osmosis membrane element and a water purifier having the same.

BACKGROUND

With regard to reverse osmosis membrane elements most widely used at present, raw water inflows from one end and flows in a direction parallel to a central tube; purified water enters a membrane bag of a reverse osmosis membrane to flow into the central tube via a through hole in the central tube and then flow out of the central tube via a purified water outlet; concentrated water which does not pass through the reverse osmosis membrane flows out of the central tube via a concentrated water-outlet at the periphery of the central tube in the direction parallel to the central tube. In this way, the raw water flows in the direction parallel to a reverse osmosis membrane assembly and the central tube and makes contact with a reverse osmosis membrane for a short time. A water flow channel of the reverse osmosis membrane assembly formed by winding in such manner is wide, and water on the surface of the reverse osmosis membrane flows at a low speed, as a result, concentration polarization is generated on the surface of the reverse osmosis membrane. Consequentially, it is prone to scaling on the surface of the reverse osmosis membrane. Furthermore, the raw water contiguously osmoses into the membrane bag in the flow direction thereof, as a result, the water concentration (saltness) is increasingly high, the water on the surface, close to the concentrated water-outlet, of the reverse osmosis membrane has increasingly high saltness, precipitation and scaling of solutes on the surface of the reverse osmosis membrane are increasingly serious. Consequentially, the use life of the reverse osmosis membrane is shortened.

Chinese Patent Publication No. CN102976447 discloses a lateral-flow reverse osmosis membrane element. A waterproof adhesive tape is located between a flow guide net and a reverse osmosis membrane. As shown in FIG. 1, the flow guide net 20' in an unfolded state is rectangular and has an end connected to a central tube 21'. The central tube 21' is located on a winding starting end of the flow guide net, and the winding direction is shown by an arrow 24' in FIG. 1. Opposite edges 22' and 23' parallel to the winding direction are coated with waterproof adhesive tapes (as shown by thick black lines). And the edge 22' extends from the winding starting end to the winding tail end, the edge 23' is partially coated with the waterproof adhesive tape 231', and a portion 232', not coated with the waterproof adhesive tape, of the edge 23' serves as a water outlet of the reverse osmosis membrane element, which is obtained after winding and a subsequent conventional process are completed. In FIG. 2, a water inlet 32' corresponds to an edge 25' in FIG. 1, and a water outlet 31' corresponds to the portion 232' not coated is with the waterproof adhesive tape in FIG. 2. In FIG. 3, a water inlet 42' corresponds to the portion 232' not coated with the waterproof adhesive tape in FIG. 1, and a water outlet 41' corresponds to the edge 25'. In this way, raw water flows in the length direction of the reverse osmosis membrane; compared with another way that water inflows from one end and outflows from the other end, this way increases the contact area of the reverse osmosis membrane, thus improving the filter efficiency of the reverse osmosis membrane and increasing the purified water reclaim rate and water flux of the reverse osmosis membrane element. However, in such way, a "dead space" exists to a certain extent, namely an area 26' in FIG. 1, the flow rate on the surface of the reverse osmosis membrane in this area is reduced, and consequentially, the use rate and efficiency of the reverse osmosis membrane are reduced. Although a waterproof adhesive tape 27' is additionally arranged in the area 26' in the prior art, the effect is limited, and the reverse osmosis membrane element still has the above problems.

SUMMARY

Technical Issues

The objective of the present application is to provide a full-effective reverse osmosis membrane element to prolong the use life of a reverse osmosis membrane element.

Solution to the Issues

Technical Solution

The present application is implemented as follows: a full-effective reverse osmosis membrane element is used to produce purified water by concentrating raw water and comprises a central tube extending from front to back and a reverse osmosis membrane assembly wound around the external tube wall of the central tube from left to right or from right to left. Water inlet holes communicated with the internal tube channel of the central tube are formed in the external tube wall of the central tube. The reverse osmosis membrane assembly comprises a pair of reverse osmosis membranes attached at front surfaces thereof and wound around the central tube. A water feed channel is formed between the front surfaces of the two reverse osmosis membranes, and a purified water channel is formed between the back surfaces of the two reverse osmosis membranes. The water feed channel has a water inlet formed in front edges of the two reverse osmosis membranes and water outlets formed in rear edges of the two reverse osmosis membranes. The reverse osmosis membrane assembly further comprises a water division structure arranged in the water feed channel and used to make a path of raw water flowing through the water feed channel longer than a linear distance between the water inlet and the water outlets when the two reverse osmosis membranes are in an unfolded state. The water division structure comprises first water division band forming a preset space with the central tube when the two reverse osmosis membranes are in the unfolded state. The first water division band divide the water feed channel into a first flow channel having a gradually decreasing cross-section and a second flow channel communicated with the first flow channel.

In the full-effective reverse osmosis membrane element of the present application, the preset space is greater than 0° and less than 90°.

In the full-effective reverse osmosis membrane element of the present application, the water division structure further comprises second water division band arranged at the front edges of the two reverse osmosis membranes and used to seal the first flow channel, third water division band arranged at the rear edges of the reverse osmosis membranes and used to seal the second flow channel, and fourth water division band arranged at the peripheries of the reverse osmosis membranes and used to seal a purified water channel.

In the full-effective reverse osmosis membrane element of the present application, the first water division bandband and the third water division band are staggered with each otherband; each first water division band comprises a first end close to the rear edges of the reverse osmosis membranes and a second end close to the front edges of the reverse osmosis membranes; and the first ends and the second ends incline in opposite directions, respectively.

In the full-effective reverse osmosis membrane element of the present application, the first ends incline towards the central tube, the second ends incline opposite to the central tube, and the first flow channel is communicated with the second flow channel at the second ends away from the central tube.

In the full-effective reverse osmosis membrane element of the present application, the water inlet is located between the second water division band and the central tube; a water supplement inlet for supplementing raw water into the first flow channel is formed between the second water division band and right edges of the reverse osmosis membranes; and the water outlets comprise a first water outlet located between the first ends and the central tube and allowing concentrated water to flow out of the first flow channel, a second water outlet located between the first ends and the third water division band and allowing concentrated water to flow out of the second flow channel, and a third water outlet located between the third water division band and the right edges of the reverse osmosis membranes and allowing concentrated water to flow out of the second flow channel.

In the full-effective reverse osmosis membrane element of the present application, the second ends incline towards the central tube, the first ends incline opposite to the central tube, and the first flow channel is communicated with the second flow channel at the second ends close to the central tube.

In the full-effective reverse osmosis membrane element of the present application, the water inlet is located between the second water division band and right edges of the reverse osmosis membranes; a water supplement inlet for supplementing raw water into the first flow channel is formed between the second water division band and the central tube; and the water outlets comprise a first water outlet located between the first ends and the right edges of the reverse osmosis membranes and allowing concentrated water to flow out of the first flow channel, a second water outlet located between the first ends and the third water division band and allowing concentrated water to flow out of the second flow channel, and a third water outlet located between the third water division band and the central tube and allowing concentrated water to flow out of the second flow channel.

The full-effective reverse osmosis membrane element of the present application further comprises an inflow water guide net arranged in the water feed channel and used to guide the raw water to flow and a purified water guide net arranged in the purified water channel and used to guide the purified water to flow. The first water division band, the second water division band, and the third water division band are paired and respectively arranged on two side faces of the inflow water guide net, and the fourth water division band is paired and respectively arranged on two side faces of the purified water guide net.

The present application further provides a water purifier comprising the above full-effective reverse osmosis membrane element.

Beneficial Effects of the Invention

The present application has the following beneficial effects:

The water feed channel is divided into the first flow channel and the second flow channel by the first water division band, and the raw water sequentially flows through the first flow channel and the second flow channel, so that the flow distance of the raw water between the two reverse osmosis membranes is increased, and the use rate of the reverse osmosis membranes is increased; and the cross-sections of the first flow channel and the second flow channel are gradually decreased in area in the flow direction of the raw water, in this way, the flow rate of the raw water in the first flow channel and the second flow channel is gradually increased, so that the decrease, caused by a polarization boundary layer, of a driving force is relieved, the raw water can flow at an approximately constant speed, lamination of the raw water in the flow channels is eliminated, and full turbulence is realized to scour pollutants on the surfaces of the reverse osmosis membranes to reduce the blockage caused by the pollutants, thus prolonging the use life of the reverse osmosis membranes.

BRIEF DESCRIPTION OF THE DRAWINGS

For the sake of a clearer explanation of the technical solutions of the embodiments of the present application, a brief description of the accompanying drawings required for the description of the embodiments is given below. Clearly, the drawings in the following description are used for illustrating certain embodiments of the present application, and those ordinarily skilled in the art can acquire other drawings of the following ones without creative labor.

DETAILED DESCRIPTION OF EMBODIMENTS

In order to provide a better understanding of the technical solutions of the present application for those skilled in the art, the technical solutions of the embodiments are clearly described below with reference to the accompanying drawings. Obviously, the embodiments in the following description are illustrative ones, and are not all possible ones of the present application. All other embodiments obtained by those ordinarily skilled in the art without creative labor should also fall within the protection scope of the invention.

The term "comprise" involved in the description, claims and accompanying drawings, and any transformations of the present application refer to non-exclusive inclusion. For instance, a process or method comprising a series of steps or units, or a system, product or device not limited to the steps or units listed, and may also comprise steps or units which are not listed, or comprise other intrinsic steps of the process or method, or other intrinsic units of the system, product or device. Besides, terms "first", "second", and "third" are used for distinguishing different objects, and are not used for describing a specific sequence.

Figure 1:
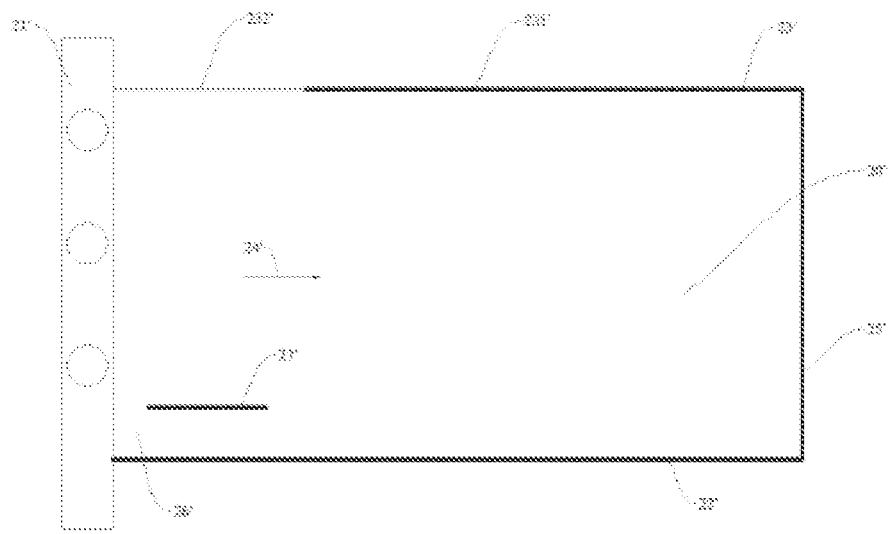
FIG. 1 is a structural diagram of a reverse osmosis membrane element in the prior art.
Figure 2:
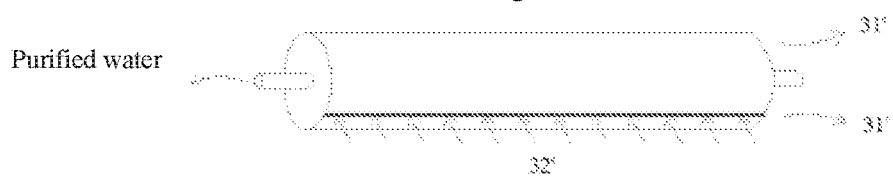
FIG. 2 is a structural diagram of the reverse osmosis membrane element, in a folded state, in FIG. 1.
Figure 3:
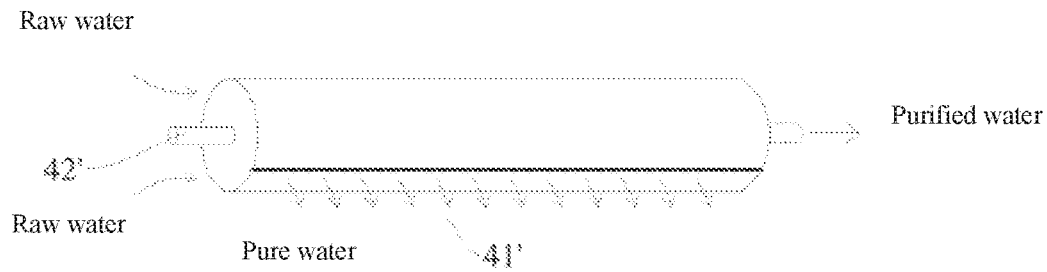
FIG. 3 is another structural diagram of the reverse osmosis membrane element, in the folded state, in FIG. 1.
Figure 4:
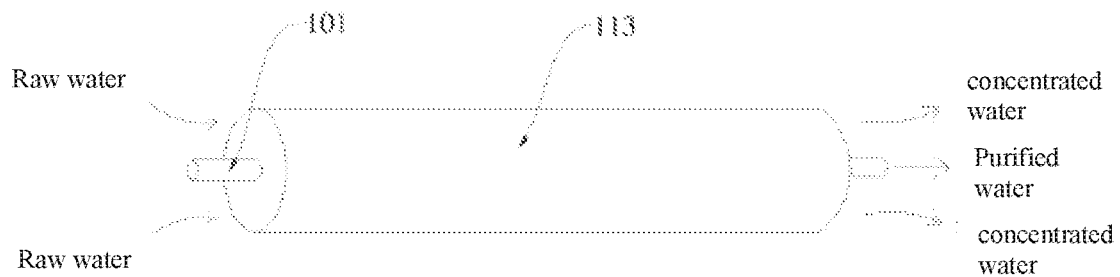
FIG. 4 is a structural diagram of a full-effective reverse osmosis membrane element in an embodiment of the present application.
Figure 5:
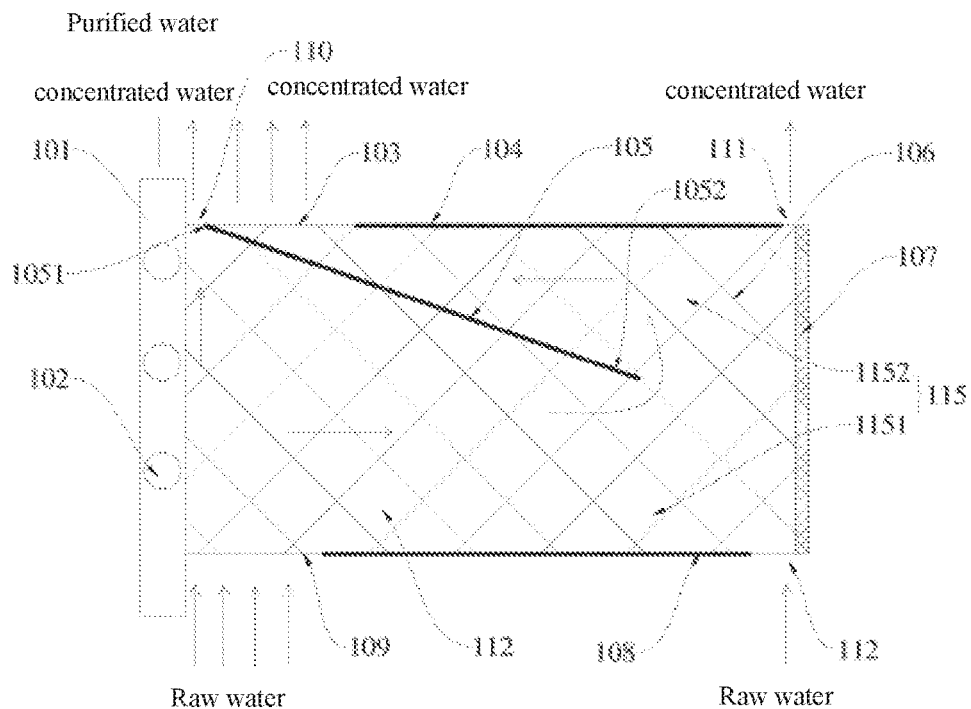
FIG. 5 is a structural diagram of a reverse osmosis membrane assembly, in an unfolded state, of the full-effective reverse osmosis membrane element in FIG. 4.
Figure 6:
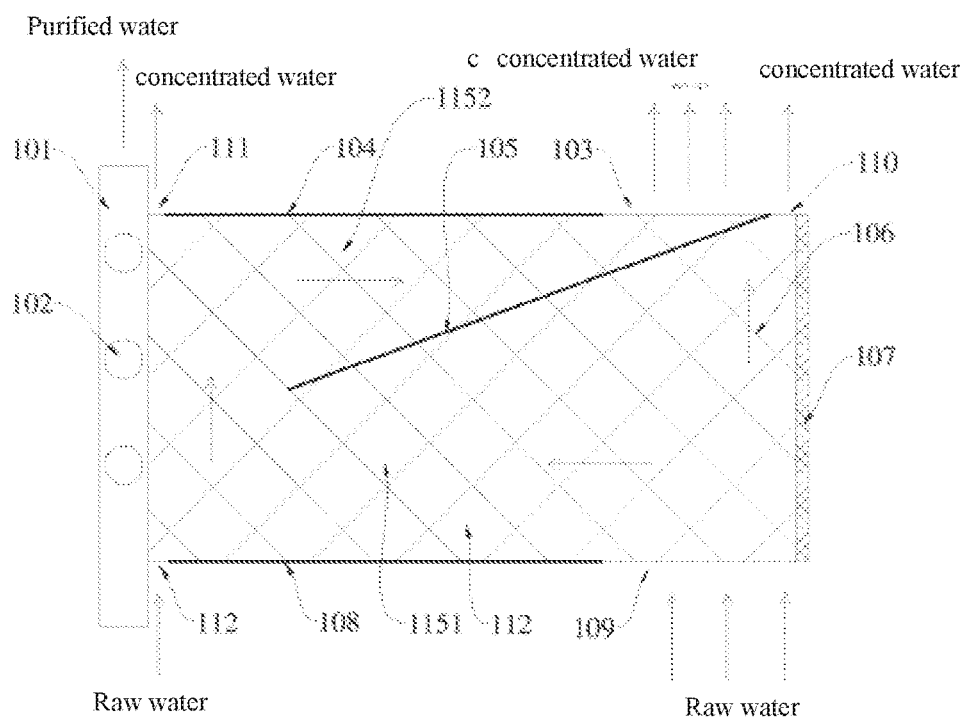
FIG. 6 is another structural diagram of the reverse osmosis membrane assembly, in the unfolded state, of the full-effective reverse osmosis membrane element in FIG. 4.

Referring to FIG. 4 to FIG. 6, an embodiment of the present application provides a full-effective reverse osmosis membrane element 100 installed in a water purifier (not shown in the figures) to produce purified water by concentrating raw water. The full-effective reverse osmosis membrane element 100 comprises a central tube 101 extending from front to back and a reverse osmosis membrane assembly 113 wounding around the central tube 101 from left to right or from right to left. The reverse osmosis membrane assembly 113 in this embodiment is wound around the central tube 101 from left to right. A plurality of water inlet holes 102 communicated with the internal tube channel of the central tube 101 and the reverse osmosis membrane assembly 113 are formed in the external tube wall of the central tube 101. The purified water flows into the central tube 101 via the water inlet holes 102 and flows in the central tube 101 from front to back. The reverse osmosis membrane assembly 113 comprises two reverse osmosis membranes 112 wound around the central tube 101 as well as a water division structure (not shown in the figures) arranged between the two stacked reverse osmosis membranes 112 wound around the central tube 101, wherein each reverse osmosis membrane 112 comprises a front surface and a back surface; and the two reverse osmosis membranes 112 are oppositely attached at the front surfaces thereof and have one sides, which are parallel to the central tube 101, connected to the central tube 101 to form a winding starting end (not shown in the figures) as well as opposite sides connected hermetically to form a winding tail end 107. In other embodiments, the winding starting end may be formed in a manner that the front surface of one reverse osmosis membrane 112 is folded in half and then connected to the central tube 101, and the winding tail end 107 is formed at a folding position.

A water feed channel 115 is formed between the front surfaces of the two reverse osmosis membranes 112, a purified water channel (not shown in the figures) is formed between the back surfaces of the two reverse osmosis membranes 112. The raw water or concentrated water flowing through the water feed channel 115 can osmose from the front surfaces to back surfaces of the reverse osmosis membranes 112 and cannot osmose from the back surfaces to front surfaces of the reverse osmosis membranes 112, that is, the raw water in the water feed channel 115 can osmose into the purified water channel to obtain the purified water, and the purified water obtained in the purified water channel cannot osmose into the water feed channel 115. The water inlet holes 102 in the central tube 101 are communicated with the purified water channel, the purified water obtained in the purified water channel flows into the central tube 101 via the water inlet holes 102 and then flows out of the rear end of the central tube 101.

Referring to FIG. 4 to FIG. 6, the full-effective reverse osmosis membrane element 100 further comprises a water inlet 109 and water outlets (not shown in the figures) which are respectively formed in edges of two sides of each reverse osmosis membrane 112, wherein the water inlet 109 is formed in front edges of the two reverse osmosis membranes 112 and allows the raw water to flow into the water feed channel 115, and the water outlets are formed in rear edges of the two reverse osmosis membranes 112 and allow the concentrated water to flow out of the water feed channel 115.

The water division structure is used to make a path of the raw water flowing through the water feed channel 115 longer than linear distances between the water inlet 109 and the water outlets when the two reverse osmosis membranes 112 are in an unfolded state. The water division structure comprises first water division band 105 which are arranged in the water feed channel 115 and form a preset space with the central tube 101 when the two reverse osteosis membranes 112 are in the unfolded state. The preset space is greater than 0° and less than 90°. The first water division band 105 in the water feed channel 115 divide, in the flow direction of the raw water, the water feed channel 115 into a first flow channel 1151 and a second flow channel 1152 communicated with the first flow channel 1151, and cross-sections of the first flow channel 1151 and the second flow channel 1152 are gradually decreased in the flow direction of the raw water.

The water feed channel 115 is divided into the first flow channel 1151 and the second flow channel 1152 by the first water division band 105, and the raw water sequentially flows through the first flow channel 1151 and the second flow channel 1152, so that the flow distance of the raw water between the two reverse osmosis membranes 112 is increased, and the use rate of the reverse osmosis membranes 112 is increased; and the cross-sections of the first flow channel 1151 and the second flow channel 1152 are gradually decreased in area in the flow direction of the raw water, in this way, the flow rate of the raw water in the first flow channel 1151 and the second flow channel 1152 is gradually increased, so that the decrease, caused by a polarization boundary layer, of a driving force is relieved, the raw water can flow at an approximately constant speed, lamination of the raw water in the flow channels is eliminated, and full turbulence is realized to scour pollutants on the surfaces of the reverse osmosis membranes 112 to reduce the blockage caused by the pollutants, thus prolonging the use life of the reverse osmosis membranes 112.

Referring to FIG. 4 to FIG. 6, each first water division band 105 comprises a first end 1051 close to the rear edges of the reverse osmosis membranes 112 and a second end 1052 close the front edges of the reverse osmosis membranes 112. The water division structure further comprises second water division band 108 arranged at the front edges of the two reverse osmosis membranes 112 and used to seal the first flow channel 1151, third water division band 104 arranged at the rear edges of the two reverse osmosis membranes 112 and used to seal the second flow channel 1152, and fourth water division band (not shown in the figures) arranged at the peripheries of the reverse osmosis membranes 112 and used to seal the purified water channel, wherein the second water division band 108 do not completely seal the first flow channel 1151 on the front sides of the two reverse osmosis membranes 112, and the third water division band 104 do not completely seal the second flow channel 1152 on the rear sides of the two reverse osmosis membranes 112.

The water outlets comprise a first water outlet 110, a second water outlet 103, and a third water outlet 111. The reverse osmosis membrane assembly 113 further comprises a water supplement inlet 112 formed in the front edges of the reverse osmosis membranes 112.

Referring to FIG. 5, in an embodiment, the first ends 1051 of the first water division band 105 incline leftwards towards the winding starting end, and the second ends 1052 of the first water division band 105 incline rightwards towards the winding tail end 107; the first flow channel 1151 is communicated with the second flow channel 1152 at the second ends 1052, and the first ends 1051 are close to the rear end of the central tube 101; and the raw water in the first flow channel 1151 flows from left to right, and the raw water in the second flow channel 1152 flows from right to left, as shown by arrows in FIG. 5.

Referring to FIG. 4 to FIG. 6, the water inlet 109 is located between the second water division band 108 and the central tube 101; the water supplement inlet 112 is located between the second water division band 108 and the winding tail end 107, and the raw water can flow into the first flow channel 1151 via the water supplement inlet 112; the width of the water inlet 109 accounts for 10%-50% of the winding length of the reverse osmosis membranes 112, and the width of the water supplement inlet 112 accounts for 0.1%-5% of the winding length of the reverse osmosis membranes 112; and the raw water flows into the first flow channel 1151 via the water supplement inlet 112, so that a dead space of the first flow channel 1151 at the water supplement inlet 112 can be eliminated, and the precipitation of the pollutants caused by a flow "dead space" of a fluid at the water supplement inlet 112 is avoided, thus increasing the use rate of the reverse osmosis membranes 112 and prolonging the use life of the reverse osmosis membranes 112.

The water outlets comprise the first water outlet 110 located between the first ends 1051 and the central tube 101, the second water outlet 103 located between the third water division band 104 and the first ends 1051, and the third water outlet 111 located between the winding tail end 107 and the third water division band 104. Most concentrated water flows out of the second flow channel 1152 via the second water outlet 103, and a little concentrated water flows out of the second flow channel 1152 via the first water outlet 110 and the second water outlet 103. The first water outlet 110 can prevent a flow "dead space" of a fluid in the first flow channel 1151 at the first water outlet 110, and portions, located at the first water outlet 110, of the first water division band 105 are oblique relative to the central tube 101 to form a flow channel having a gradually decreasing cross-section, so that the fluid flows out of the first water outlet 110 at a gradually increased flow rate to scour the pollutants on the front surfaces of the reverse osmosis membranes 112, thus increasing the use rate of the reverse osmosis membranes 112. The third water outlet 111 can eliminate the dead space of the second flow channel 1152 at the third water outlet 111 to avoid the precipitation of the pollutants caused by a flow "dead space" of a fluid at the third water outlet 111, thus increasing the use rate of the reverse osmosis membranes 112.

Referring to FIG. 4 to FIG. 6, the width of the first water outlet 110 accounts for 0.1%-5% of the winding length of the reverse osmosis membranes 112 the width of the second water outlet 103 accounts for 10%-50% of the winding length of the reverse osmosis membranes 112; and the width of the third water outlet 111 accounts for 0.1%-5% of the winding length of the reverse osmosis membranes 112.

Referring to FIG. 6, in another embodiment, the first ends 1051 of the first water division band 105 incline rightwards towards the winding tail end 107, the second ends 1052 of the first water division band 105 incline leftwards towards the winding starting end; the first flow channel 1151 is communicated with the flow channel at the second ends 1052 close to the central tube 101; and the raw water in the first flow channel 1151 flows from right to left, and the raw water in the second flow channel 1152 flows from left to right, as shown by arrows in FIG. 6.

The water inlet 109 is located between the second water division band 108 and the winding tail end 107, and the water supplement inlet 112 is located between the central tube 101 and the second water division band 108; the first water outlet 110 is located between the winding tail end 107 and the first ends 1051, the second water outlet 103 is located between the third water division band 104 and the first ends 1051, and the third water outlet 111 is located between the winding starting end and the third water division band 104. In this way, the "dead space" of the fluid can also be avoided, and the pollutants can be scoured, so that the use life of the reverse osmosis membranes 112 is prolonged, and the use effect of the reverse osmosis membranes 112 is improved.

Figure 7:
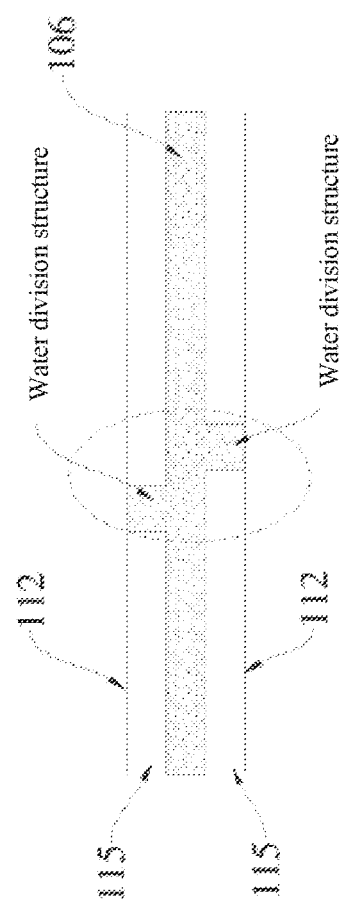
FIG. 7 is a structural diagram of a water division structure and an inflow water guide net, which are integrally formed, of the full-effective reverse osmosis membrane element in FIG. 4.

Referring to FIG. 7, the reverse osmosis membrane assembly 113 further comprises an inflow water guide net 106 arranged in the water feed channel 115 and used to guide the raw water to flow into the water feed channel 115 as well as a purified water guide net (not shown in the figure) arranged in the purified water channel and used to guide the purified water to flow into the purified water channel.

The first water division band 105, the second water division band 108, and the third water division band 104 are paired and respectively arranged on two side faces of the inflow water guide net 106. Particularly, the two first water division band 105, the two second water division band 108, and the two third water division band 104 are integrally arranged on the two side faces of the inflow water guide net 106 by means of hot-press forming and are wound around the central tube 101.

Referring to FIG. 4 to FIG. 6, the fourth water division band is paired and respectively arranged on two side faces of the purified water guide net. Particularly, the fourth water division band are integrally arranged on the two side faces of the purified water guide net by means of hot-press forming and are wound around the central tube 101.

The water division structure formed by means of hot-press forming is low in cost and simple in process. In other embodiments, the water division structure may be formed by means of gluing.

The winding tail end 107 is coated with a sealing compound to make sure that the reverse osmosis membranes 112 can be better wound around the central tube 101.

The embodiment of the present application further provides a water purifier (not shown in the figures) having the above full-effective reverse osmosis membrane element 100. Compared with common water purifiers having RO filter elements with a rated flux rate of 75 G, the water purifier having the above full-effective reverse osmosis membrane element 100 has average water flux GPD increased from 78.5 to 90.1 and NaCl salt rejection (%) increased from 97.8 to 98.8 in a test solution at an NaCl concentration of 250 ppm.

The above embodiments are only preferred ones of the present application, and are not intended to limit the present application. Any modifications, equivalent substitutes and improvements achieved based on the spirit and principle of the present application should also fall within the protection scope of the invention.

What is claimed is:

1. A full-effective reverse osmosis membrane element, comprising:
   a central tube and a reverse osmosis membrane assembly winding around an external tube wall of the central tube;
   the reverse osmosis membrane assembly comprising:
      reverse osmosis membranes, a guide net, a water division structure, a water inlet for inflow of raw water and a water outlet for outflow of concentrated water, the water inlet and the water outlet being respectively provided at edges of both sides of the reverse osmosis membranes, a first water division band of the water division structure dividing a water feed channel into a first flow channel and a second flow channel, the raw water sequentially flowing through the first flow channel and the second flow channel, and the first flow channel and the second flow channel each having a cross-section gradually decreased in area in a flow direction of the raw water;
   a first water supplement inlet located on a side of the water inlet and used for water inflow; and
   a second water supplement inlet located on a side of the water outlet and used for water outflow,
   wherein the water division structure further includes a second water division band arranged at front edges of the reverse osmosis membranes and used to seal the first flow channel, and a third water division band arranged at rear edges of the reverse osmosis membranes and used to seal the second flow channel;
   the first water supplement inlet being located between the second water division band and a winding tail end of the reverse osmosis membrane assembly and the second water supplement inlet being located between the third water division band and the winding tail end of the reverse osmosis membrane assembly; and
   wherein a width of the first water supplement inlet accounts for between 0.1%-5% of a winding length of the reverse osmosis membranes, and a width of the second water supplement inlet accounts for between 0.1%-5% of the winding length of the reverse osmosis membranes.

2. The full-effective reverse osmosis membrane element of claim 1, wherein the water division structure further comprises a fourth water division band arranged at peripheries of the reverse osmosis membranes and used to seal the purified water channel.

3. The full-effective reverse osmosis membrane element of claim 1, wherein the water inlet is located between the second water division band and a winding starting end of the reverse osmosis membrane assembly.

4. The full-effective reverse osmosis membrane element of claim 1, wherein the water outlet is located between the third water division band and a winding starting end of the reverse osmosis membrane assembly.

5. The full-effective reverse osmosis membrane element of claim 1, wherein a width of the water inlet accounts for 10%-50% of a winding length of the reverse osmosis membrane, and/or a width of the water outlet accounts for 10%-50% of the winding length of the reverse osmosis membrane.

6. The full-effective reverse osmosis membrane element of claim 1, wherein the first water division band, the second water division band, and the third water division band are paired and respectively arranged on two side faces of the flow guide net.

7. The full-effective reverse osmosis membrane element of claim 1, wherein the first water division band, the second water division band, and the third water division band are integrally formed with the inflow water guide net and are wound around the central tube.

8. A water purifier, comprising the full-effective reverse osmosis membrane element of claim 1.

* * * * *